(12) United States Patent
Taylor et al.

(10) Patent No.: US 10,987,769 B2
(45) Date of Patent: Apr. 27, 2021

(54) TOOLING BASE

(71) Applicant: FIFTH AXIS, INC., San Diego, CA (US)

(72) Inventors: Chris Taylor, San Diego, CA (US); Steve Grangetto, San Diego, CA (US); Adam Lane, San Diego, CA (US)

( * ) Notice: Subject to any disclaimer, the term of this patent is extended or adjusted under 35 U.S.C. 154(b) by 326 days.

(21) Appl. No.: 16/317,552

(22) PCT Filed: Sep. 9, 2018

(86) PCT No.: PCT/US2018/050128
§ 371 (c)(1),
(2) Date: Jan. 13, 2019

(87) PCT Pub. No.: WO2019/083623
PCT Pub. Date: May 2, 2019

(65) Prior Publication Data
US 2020/0346311 A1    Nov. 5, 2020

(51) Int. Cl.
*B23Q 1/00*        (2006.01)
*B25B 1/10*        (2006.01)
(Continued)

(52) U.S. Cl.
CPC ............ *B23Q 1/0072* (2013.01); *B25B 1/103* (2013.01); *B25B 1/2484* (2013.01); *B25B 5/006* (2013.01); *F16B 2/12* (2013.01); *F16B 21/073* (2013.01)

(58) Field of Classification Search
CPC .. B25B 1/02; B25B 1/10; B25B 1/103; B25B 1/24; B25B 1/2405; B25B 1/2452; B25B 1/2473; B25B 1/2478; B25B 1/2489; B25B 5/00; B25B 5/006; B25B 11/00; B25B 11/02; B23Q 1/0072; B23Q 3/102; B23Q 3/02; B23Q 3/10; B23Q 3/103; B23Q 3/105; B23Q 3/106; B23Q 3/107; B23Q 3/108; B23Q 3/06; B23Q 3/04; B23Q 3/154; B23Q 2703/12; B23Q 2716/08; B23P 19/00; B23P 19/04; B25J 15/04;
(Continued)

(56) References Cited

U.S. PATENT DOCUMENTS 8,020,877 B2    9/2011   Lang
8,702,077 B2    4/2014   Liu
(Continued)

FOREIGN PATENT DOCUMENTS

WO    WO2016116346      7/2016

OTHER PUBLICATIONS

Jergens manufacturing, Catalog Fixture-Pro(R) multi-axis quick change fixture, http://www.jergensinc.com/site/templates/PDFs/MULTI-AXIS_0216.pdf, visited Jun. 8, 2017.

*Primary Examiner* — Lee D Wilson
*Assistant Examiner* — Robert F Neibaur
(74) *Attorney, Agent, or Firm* — Mark Wisnosky

(57) ABSTRACT

A tooling base that is an improvement over current designs in the form of simplified number of parts, easier manufacturing of parts and that can be actuated for clamping and releasing a tooling fixture by pneumatic, other computer controlled means as well as manually is described. The tooling base uses clamping fixtures that are spring loaded to press cleats into recesses on alignment studs that locate and hold any variety of tooling fixtures to the base.

9 Claims, 18 Drawing Sheets

(51) Int. Cl.
*B25B 1/24* (2006.01)
*B25B 5/00* (2006.01)
*F16B 2/12* (2006.01)
*F16B 21/07* (2006.01)

(58) Field of Classification Search
CPC ...... B25J 15/0408; B25J 15/0416; F16B 2/12; F16B 21/073; F16B 21/08; F16B 21/09
USPC ....... 269/37, 309, 310, 71, 166, 54, 271, 43, 269/136, 244, 154
See application file for complete search history.

(56) References Cited

U.S. PATENT DOCUMENTS

| | | | |
|---|---|---|---|
| 8,708,323 B2 | 4/2014 | Hoyt et al. | |
| 9,902,033 B1 | 2/2018 | Taylor | |
| 10,603,750 B1* | 3/2020 | Taylor | B23Q 3/103 |
| 2004/0256780 A1* | 12/2004 | Lang | B23Q 16/00 |
| | | | 269/309 |
| 2007/0007704 A1* | 1/2007 | Hooper | B25B 1/103 |
| | | | 269/246 |
| 2007/0187909 A1 | 8/2007 | Troxler | |
| 2013/0043634 A1 | 2/2013 | Kitaura et al. | |
| 2015/0158150 A1 | 6/2015 | Taylor et al. | |
| 2020/0070291 A1* | 3/2020 | Chou | B23Q 1/0072 |

\* cited by examiner

TOOLING BASE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

Technical Field

The present invention relates to a pneumatically actuated tooling base that is used to attach a variety of tooling fixtures that would hold a workpiece to a work surface for machining. The base allows the fixtures and workpieces to be removed and re-attached robotically, while maintain registration accuracy.

Related Background Art

A tooling fixture is used to hold a workpiece during intricate machining such as 5 axis machining. The fixture system requires that the workpiece be held securely and precisely and provides access to a machine tool to all facets of the workpiece. Preferably it is possible to prepare the raw stock and easily and removably mount the stock in the fixture to present to a machine to create a part. Often Tooling fixtures are mounted directly to the bed or work surface of the milling machine. However, in many cases it is necessary to process a part on different machines requiring the part to be removed from one machine, worked or processed elsewhere and returned to the first machine. It is important that upon reinstallation the registration of the part to the tooling fixture to the machine is maintained to very tight tolerances. A solution to this problem is a tooling base. This is a system that attaches to a milling or other machining device and is precisely registered to that device. A vise or other fixture is then attached to the tooling base, again with precise registration to the tooling base, and therefore to the machining device. The tooling base further provides means to detach and re-attach the tooling fixture while maintaining precise registration. Tooling bases are known, such as those described in U.S. Pat. No. 8,708,323 and US patent application 20040256780. However, the internal design of the known tooling bases, especially the mechanism that is used to clamp and release the tooling fixture to the base, are complicated and difficult to manufacture. In some case precision parts are designed such that they require machining, heat treatment, and then additional machining after heat treatment to compensate for dimensional changes during heat treatment. In other cases, the mechanism is made up of a large number of precision parts that require multiple surfaces to fit together to ensure precise registration.

In some cases, there is a need for a tooling base that can be automatically actuated. There is a need for an internal clamp and release mechanism that can be actuated using power supplied by a variety of means. There is a need for a tooling base that can be actuated by any of a non-limiting list of means, including compressed air, and, therefore actuated pneumatically, and other non-compressible fluids and operated hydraulically, by an electromechanical mechanism and/or manually. There is a need for improved design in tooling bases that are easy to manufacture, have few parts and still maintain precise registration of the tooling fixture to the tooling base and the tooling base to the machine, and, enable removal and reattachment of the tooling fixture using automation. There is a need for a tooling fixture that can be easily adapted to precisely locate a plurality of types and numbers of tooling fixtures.

An improved design for a tooling base that addresses the defects in prior art designs is described.

BRIEF DESCRIPTION OF THE DRAWINGS

Features are numbered equivalently through all drawings.

DETAILED DESCRIPTION OF THE INVENTION

Figure 1:
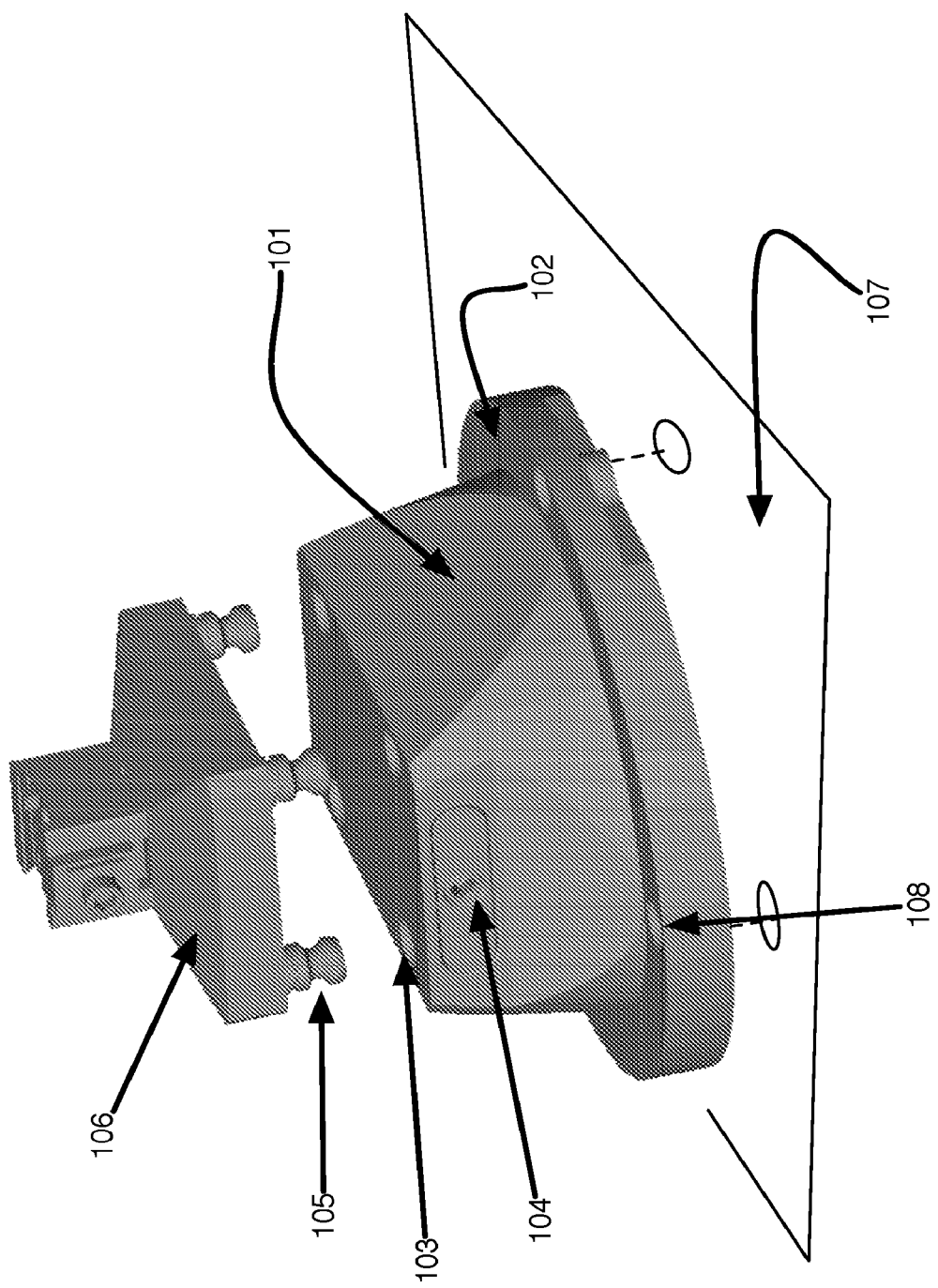
FIG. 1 is a top perspective view showing a tooling fixture as it would attach to a tooling base.

Referring to FIG. 1, a tooling fixture is shown. The tooling base 101 comprises a base platform 102 that is attached to the work surface 107 of a milling or other processing machine that requires precise registration. The attachment is through use of alignment pins and bolt holes 108 as are known in the art. The base further includes a plurality of registration holes 103 into which alignment studs 105 are inserted. A screw socket 104 is turned that operates an internal clamp to clamp the alignment studs 105 in the tooling holes 103 and thereby register the tooling fixture 106 to the base. The base 102 is registered to the milling or other processing machine using tooling pins (not shown) and bolts (not shown) as are known in the art. The tooling fixture 106 may be removed by actuating the screw socket 104 and lifting from the tooling base. The tooling base remains clamped and registered to the processing machine. The fixture may be reinserted to the base and upon actuating the screw is clamped via the alignment studs 105 to the tooling base and registration to the base is renewed. The tooling fixture may therefore be repeatedly attached to and removed from the tooling base and each time of reattachment, registration is maintained. Although shown as a vise the tooling fixture may be any sort or configuration of holding device that uses the alignment studs 105.

Figure 2:
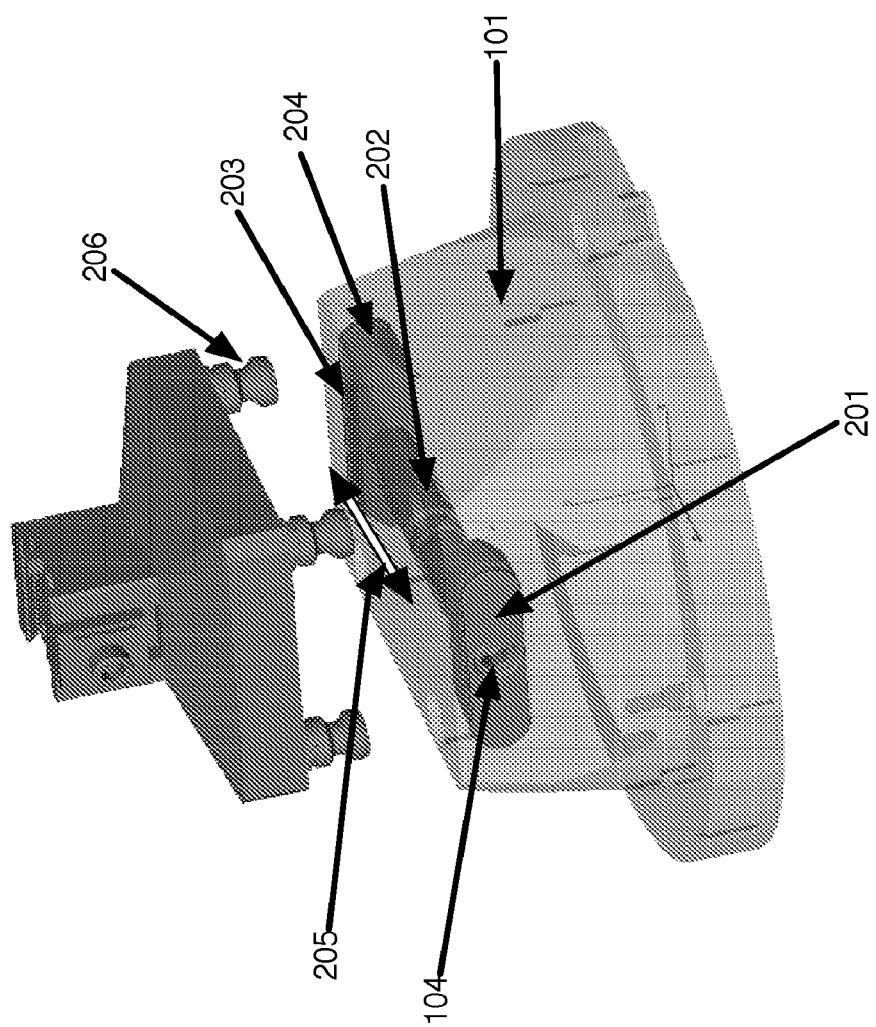
FIG. 2 is a view that shows the internal elements of the tooling base of FIG. 1.

FIG. 2 shows the internal components of the tooling base of FIG. 1. Common numbers refer to the same parts. The base 101 includes a pair of clamping fixture 201, 203 that are interconnected by a threaded shaft 202. The shaft is threaded with right and left handed threads at either end, such that turning the screw socket causes the clamping fixtures to move simultaneously either apart 205 or together on actuating the screw socket 104. The clamping fixtures 201, 203 include tapered regions 204 at each end that engage the indentations 206 on the alignment studs and when fully tightened against the alignment studs cause the alignment studs to be clamped against the inner wall of the tooling holes (103 FIG. 1) and register the tooling fixture to the base. Note, in this embodiment, operating the single screw socket causes simultaneous clamping of all four alignment studs. The clamping fixtures 201, 203 and the interconnecting threaded shaft 202 are loose within a region inside the base and have a degree of play that is determined by stops (shown in later detail) within the interior of the tooling base. The precise registration of the tooling base, the tooling fixture and the machine is through contact of the alignment studs with the inner walls of the tooling holes 103. The limited degree of play in the clamping mechanism results in a mechanism that requires fewer moving parts and reduced requirements as to accuracy and precision while maintaining the precision and accuracy of the registration of the tooling fixture to the tooling base and therefore to the machine to which the base is attached.

Figure 3:
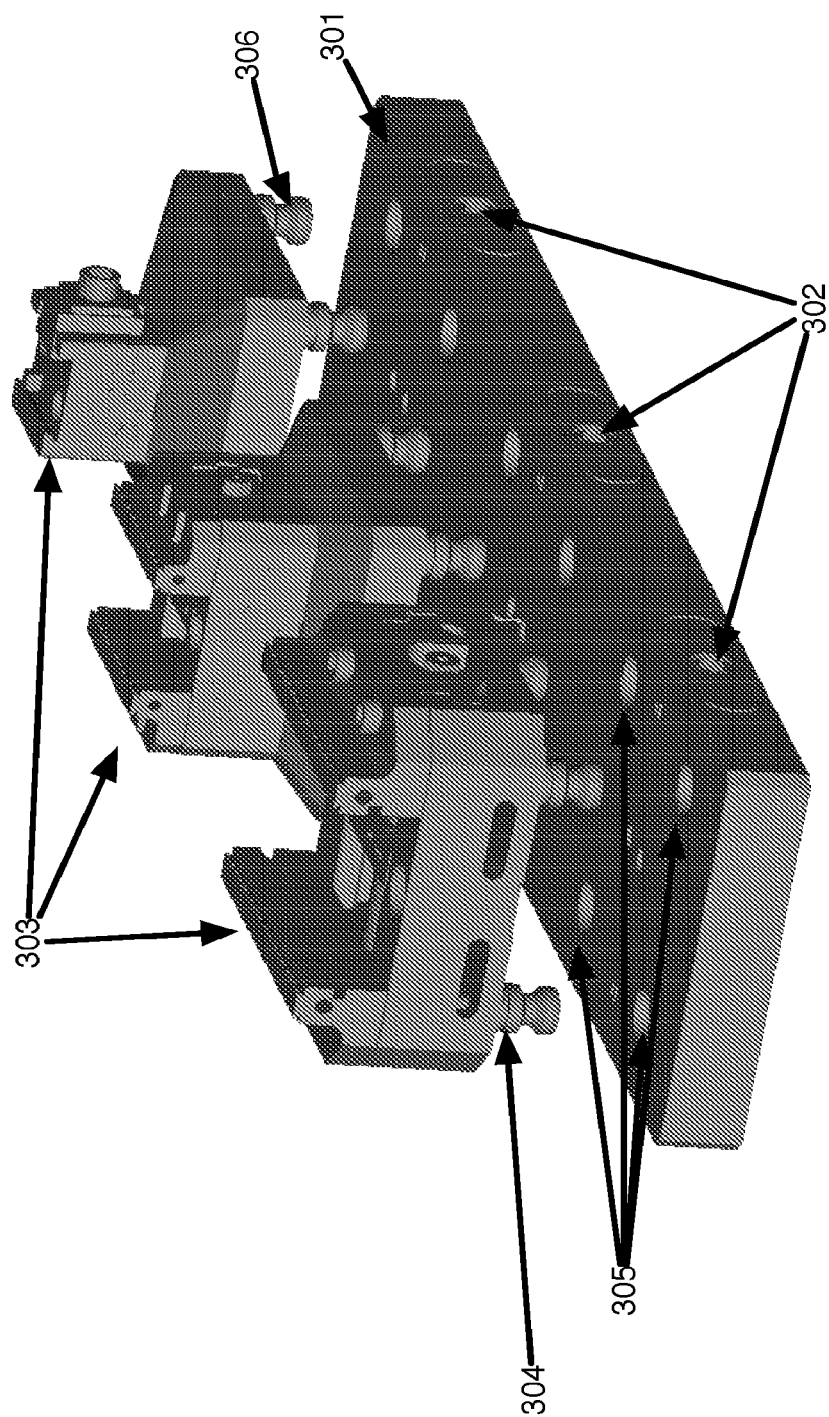
FIG. 3 shows a tooling base that accommodate a plurality of tooling fixtures.

FIG. 3 shows a tooling base 301 that includes positions to attach a plurality of tooling fixtures 303. The tooling fixtures need not all be identical. The tooling fixtures each include tooling holes (not visible) to which are attached the alignment studs 304 that include an indentation 306 that is engaged by the internal clamping fixtures (not visible) when the screw sockets 302 are actuated. Each of the tooling fixtures 303 may thereby be independently clamped to and removed from the tooling base 302. The tooling base can include a variety of configurations (compare FIGS. 1 and 3) and hold a plurality of tooling fixtures also having a variety of configurations.

Figure 4A:
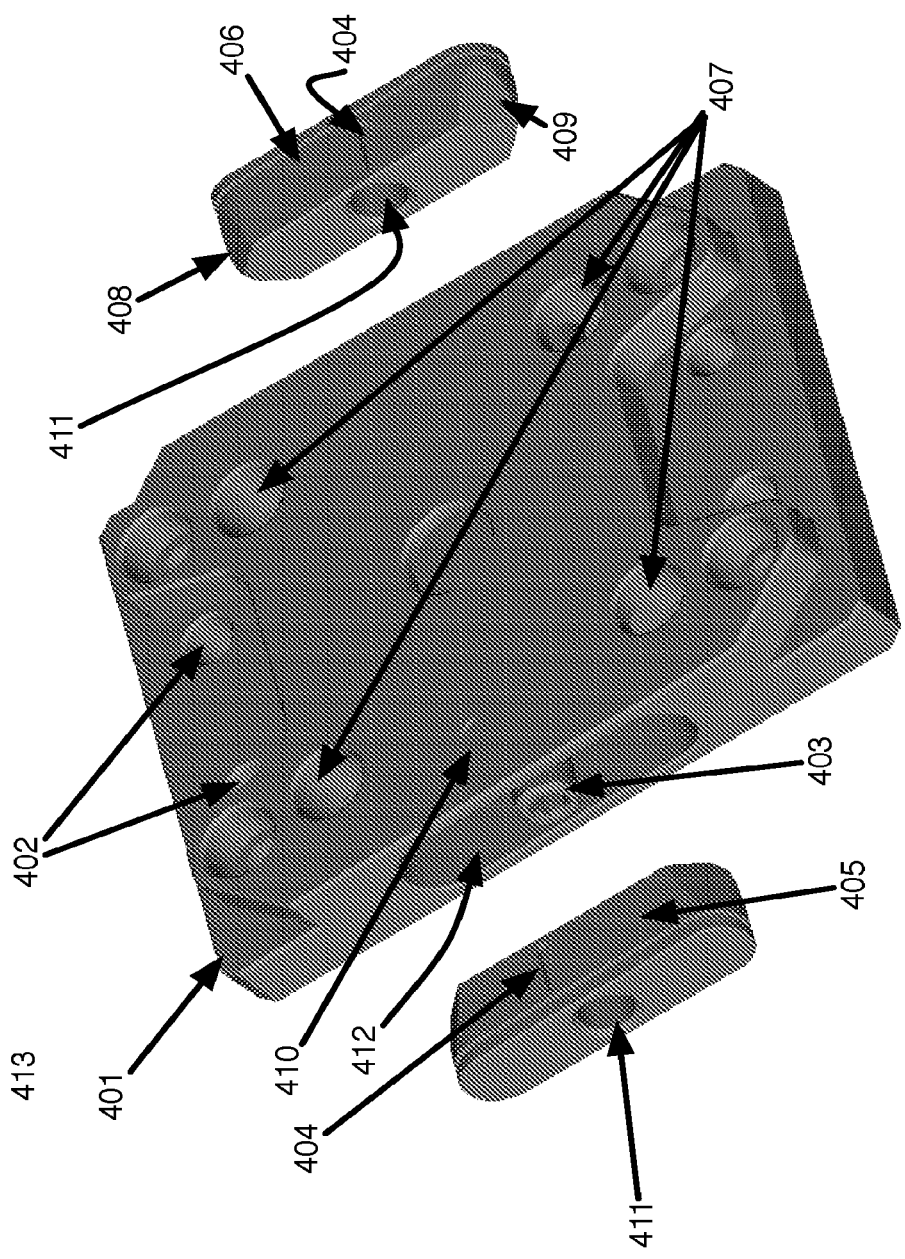
FIG. 4A shows additional detail of the parts of the invented tooling base.
Figure 4B:
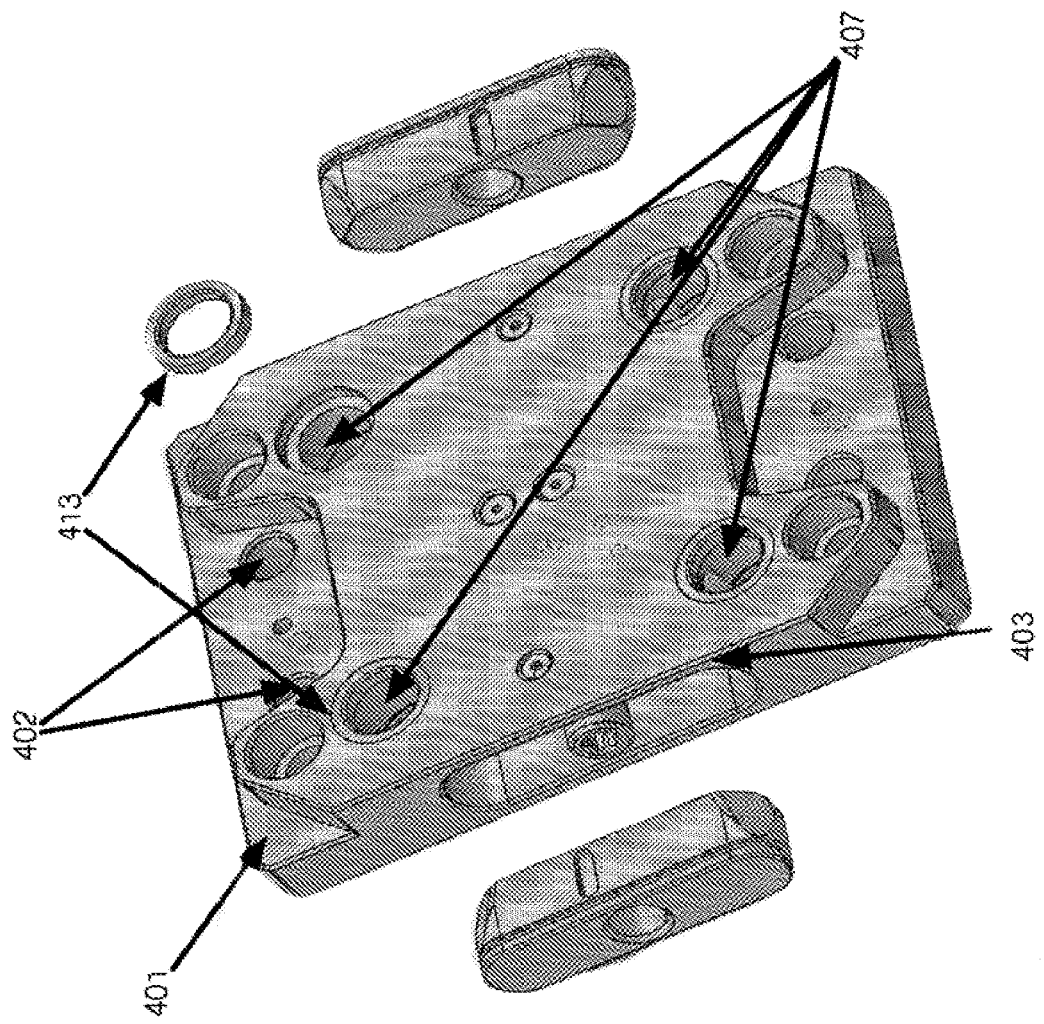
FIG. 4B shows the tooling base of FIG. 4A modified to accommodate use of softer materials for the base.

FIG. 4A shows yet another configuration of the tooling base with the common invented mechanism. The tooling base 401 is comprised of tooling pins (not shown) and bolt holes 402 that are used to clamp the tooling base to the work surface of a milling machine or other processing device. Note, in another embodiment, a plurality of bases may be stacked. The base of FIG. 4 can be one of the several fixtures 303 attached to the base 301 of FIG. 3. The tooling base 401 further includes clamping fixtures 405, 406 that fit inside slot 412 the fixtures are moveable towards and away from each other within the slot. The fixtures each include a threaded hole 411 that fits to the threaded shaft 403. Turning of the threaded shaft causes the clamping fixtures to move either towards one another or away from one another. When moving towards one another the fixtures move to clamp alignment studs (not shown) within the tooling holes 407 and thereby aligning a fixture attached to the alignment studs to the tooling base. In this embodiment the clamping fixtures each further include a slot 404 into which fits a pin 410. The pin and the slot act as a stop. The fixtures attached to the threaded shaft 403 are free to move within the slot 412 in a direction parallel to the shaft over a distance that is the length of the slot 404. As the shaft is rotated in a first direction the fixtures are pulled towards one another by rotation of the threaded shaft 403 in the threaded holes 411 The tapered ends 408, 409 on each of the fixtures (ends on only one fixture are labeled) engage the indentation (see for example 306, FIG. 3) and clamp the alignment studs against the wall of the tooling holes 407 and thereby align the fixture (not shown) to the base. Rotation of the threaded shaft in a second direction, opposite to that of the first direction causes the alignment fixtures to move apart thereby releasing the alignment studs from the tooling holes. In one embodiment the tooling base is made of steel. In another embodiment shown in FIG. 4B the tooling base is made of a relatively soft material and the tooling holes are lined with a relatively hard bushing 413. Non-limiting examples of the softer material include aluminum, iron, injection molded plastic, reinforced plastic and filled plastic. Non-limiting examples of a harder material used for the bushings include steel, titanium, ceramic, and, filled or reinforced material that has a hardness rating higher than that used for the base.

Figure 5:
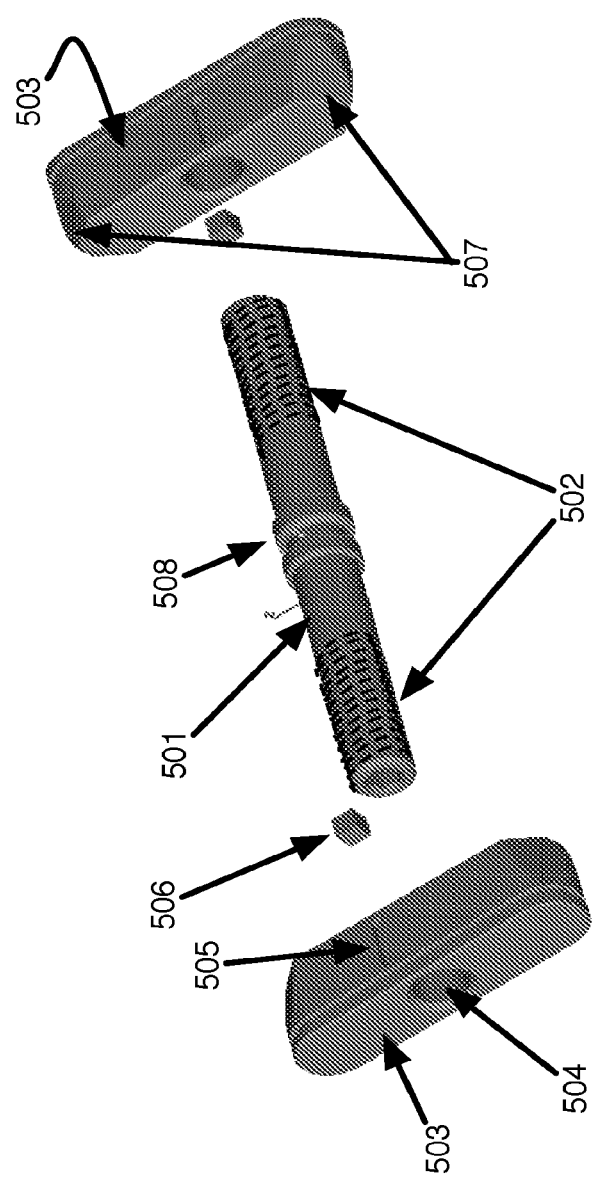
FIG. 5 shows details of a first embodiment of the internal components of the tooling base of FIGS. 4A and 4B.

Details of the internal components of the tooling base of FIG. 4 are shown in FIG. 5. The tooling base includes a pair of clamping fixtures 503 that are interconnected by a threaded shaft 501. Right and left hand threads 502 fit into threaded holes 504 such that rotation of the shaft in a first direction causes the clamping fixtures to move towards one another and rotation of the shaft in a second direction causes the clamping fixtures to move away from one another. In this embodiment each of the clamping fixtures include tapered ends 507 that engage indentations on the alignment studs (not shown) and thereby align and clamp the alignment studs to the tooling base. In this embodiment, stops are incorporated into each of the clamping fixtures. The stops are comprised of a slot 505 milled into a surface of the clamping fixture and a stud 506 that fits within the slit and limits movement of the clamping fixture to the length of the slot. The figure further shows ridges 508 that are incorporated on the threaded shaft 501. The ridges are used as stops in other embodiments and are not needed in the embodiment shown.

Figure 6:
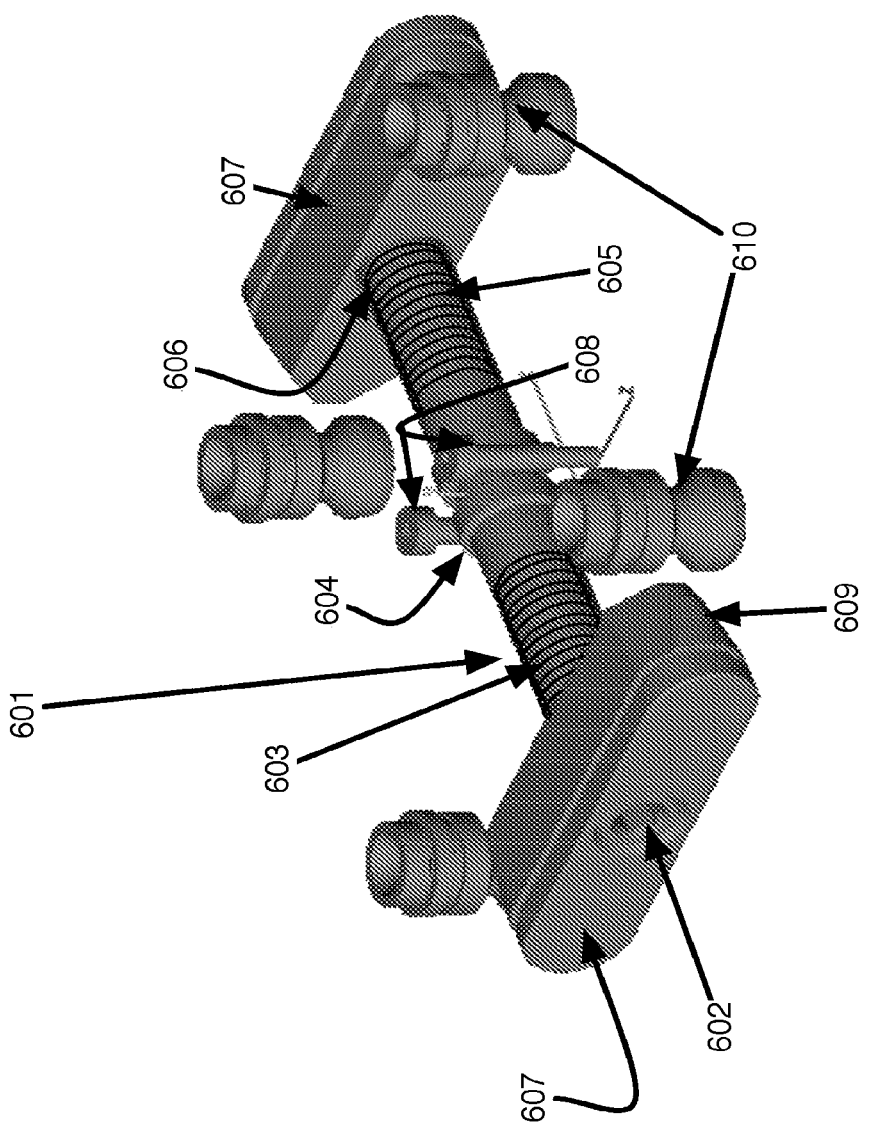
FIG. 6 shows details of a second embodiment of the internal components of the tooling base.

FIG. 6 shows a second embodiment of the internal components of the tooling base. The components include clamping fixtures 607 that are fitted to a threaded shaft 601 through threaded holes 602. The threads on the shaft 603, 605 include left hand and right hand threads such that rotation of the shaft causes the clamping fixture to move towards and away from one another. In this embodiment each end 609 of the clamping fixtures are tapered to engage an indentation on the alignment studs 610 thereby clamping the alignment studs in place when the shaft is rotated to bring the clamping fixtures towards one another. The tooling base further includes a stop. The stop is comprised of a pair of ridges 604 incorporated on the shaft and cylindrical posts 608 that fit between the ridges and thereby restrict the movement of the combined assembly of the alignment fixtures and the shaft to the width of the region between the ridges 604. Note that in this embodiment and the previous one movement of the alignment fixtures by rotation of the threaded shaft 601 causes simultaneous clamping and release, of four of the alignment studs 610.

Figure 7:
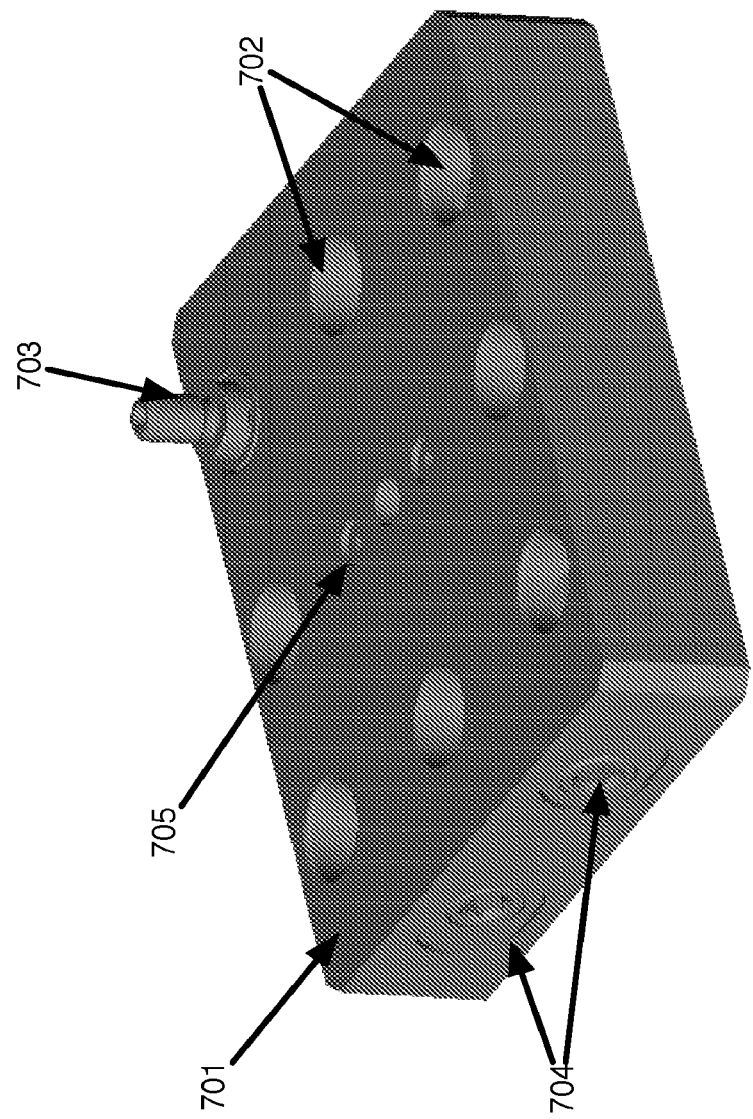
FIG. 7 shows a tooling base that uses a third embodiment of the internal components.

A third embodiment of the tooling base is shown in FIG. 7. The tooling base 701 is comprised of a base that is registered and clamped to a milling or other processing machine as is known in the art and the base includes tooling holes 702 into which are fitted alignment studs 703. This embodiment includes at least one threaded shaft (two are shown in the example) that when rotated causes clamping fixtures (best seen in FIG. 8) to engage the alignment studs and clamp the studs in place in the tooling hole 702 of the base. The tooling base further includes a stop that is comprised of at least one post 705 that is threaded into the tooling base 701 and extends into the interior and fits within a pair of ridges on the threaded rod(s) 704.

Figure 8:
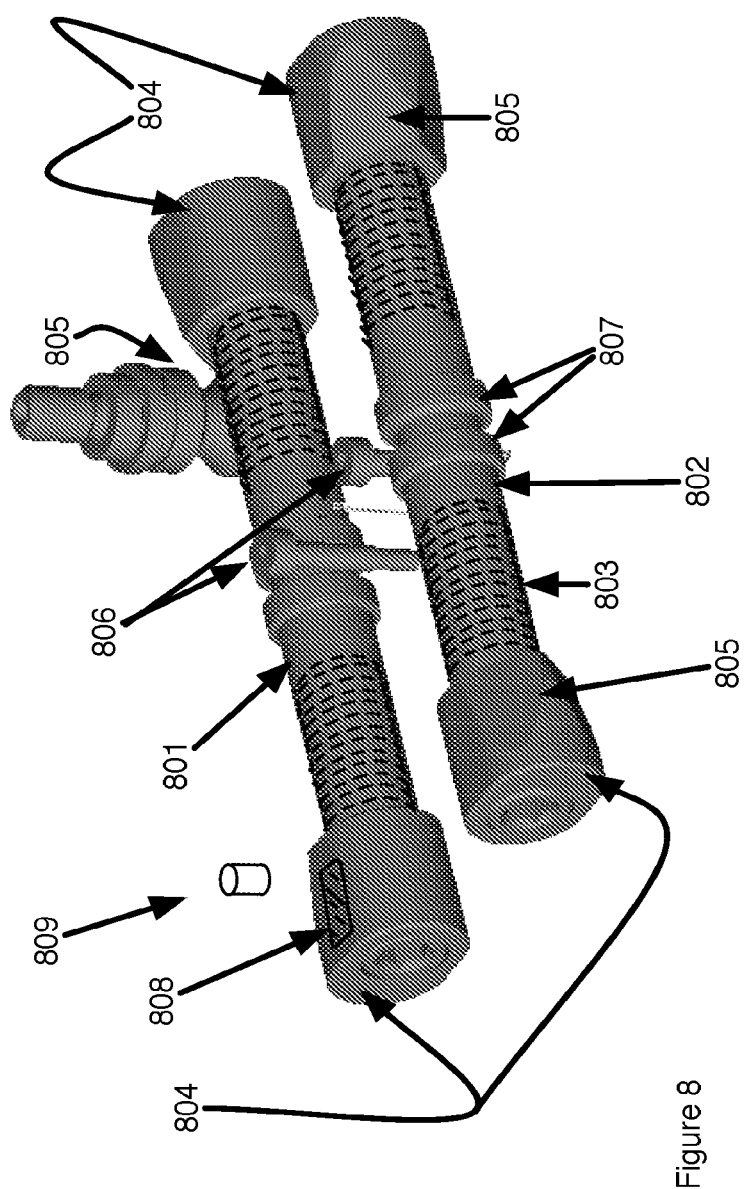
FIG. 8 shows the internal components of the tooling base of FIG. 7.

FIG. 8 shows details of interior components of the tooling base of FIG. 7. The tooling base is comprised of at least one threaded shaft 801, 802 (here two are shown) that include threaded regions 803. Clamping fixtures 804 include threaded holes (not labeled) and are threaded onto each end of the shafts. Right and left hand threads on the threaded shaft and the clamping fixtures result in alignment fixtures on a shaft to move towards each other when the shaft is rotated in a first direction and away from each other when the shaft is rotated in a second opposite direction. The clamping fixtures include at least one tapered region 805 that interacts with indentations on alignment studs (shown in previous figures) located in the tooling holes of the base, such that when the shaft is rotated and the clamping fixture moves toward and firmly contacts the alignment stud the stud is locked in place within the tooling hole thereby precisely locating a tooling fixture attached to the alignment stud relative to the tooling base. The tooling base further includes stops that limit the motion of the threaded rod and the attached clamping fixtures. In the embodiment shown the stop is comprised of a pair of ridges 807 located on each of the threaded shafts 801, 802 and a post 806 that fits through a hole on the tooling base and fits between the ridges on the threaded shaft such that the movement of the threaded shaft, in a direction parallel to the axis of the threaded shaft, is limited to the width of the space between the ridges. The stop limits travel of the threaded shaft to a preselected distance that distance being determined by the width of the space between the ridges on the threaded shaft. In the preferred embodiment shown in the figure the ridges 807 are circumferential ridges on the threaded shaft. In another embodiment (not shown) the ridges are located only in the region where contact would be made with the posts 806. In another embodiment, similar to that shown previously, the stop is comprised of a slot 808 that is cut into a surface of the clamping fixture 804 and a pin 809 that is attached through the tooling base and fits into the slot such that movement of the clamping fixture in the direction parallel to the axis of the threaded shaft is limited to the length of the slot. The number of clamping fixtures may be varied depending upon the application. In the embodiment shown there are two threaded shafts and four clamping fixtures. The threaded shafts operate independently. In another embodiment (not shown) there is a single threaded shaft and a single clamping fixture fitted to a first end of the threaded shaft. In another embodiment there is a single threaded shaft and two clamping fixtures, one threaded onto each end of the threaded shaft. In embodiments previously shown, a single threaded shaft is used to operate two clamping fixtures such that each clamp two of the alignment studs. In general, there is at least one threaded shaft that includes a stop and at least one clamping fixture that clamps at least one alignment stud in place upon rotation of the threaded shaft. The clamping fixture(s), when released, that is not engaging the alignment stud(s), and the threaded shaft may move relative to the base by an amount defined by the gap or slot in the stop. This play in the system enables a simplified clamping mechanism that is easier to manufacture while maintaining precision and accuracy of the registration of the tooling fixture to the tooling base. Prior art systems used clamping systems that either used significantly more moving parts, or, the shaft and the clamping mechanism are rigidly fixed therefore requiring more precision and extra steps and expense in manufacturing the clamping mechanism.

Figure 9:
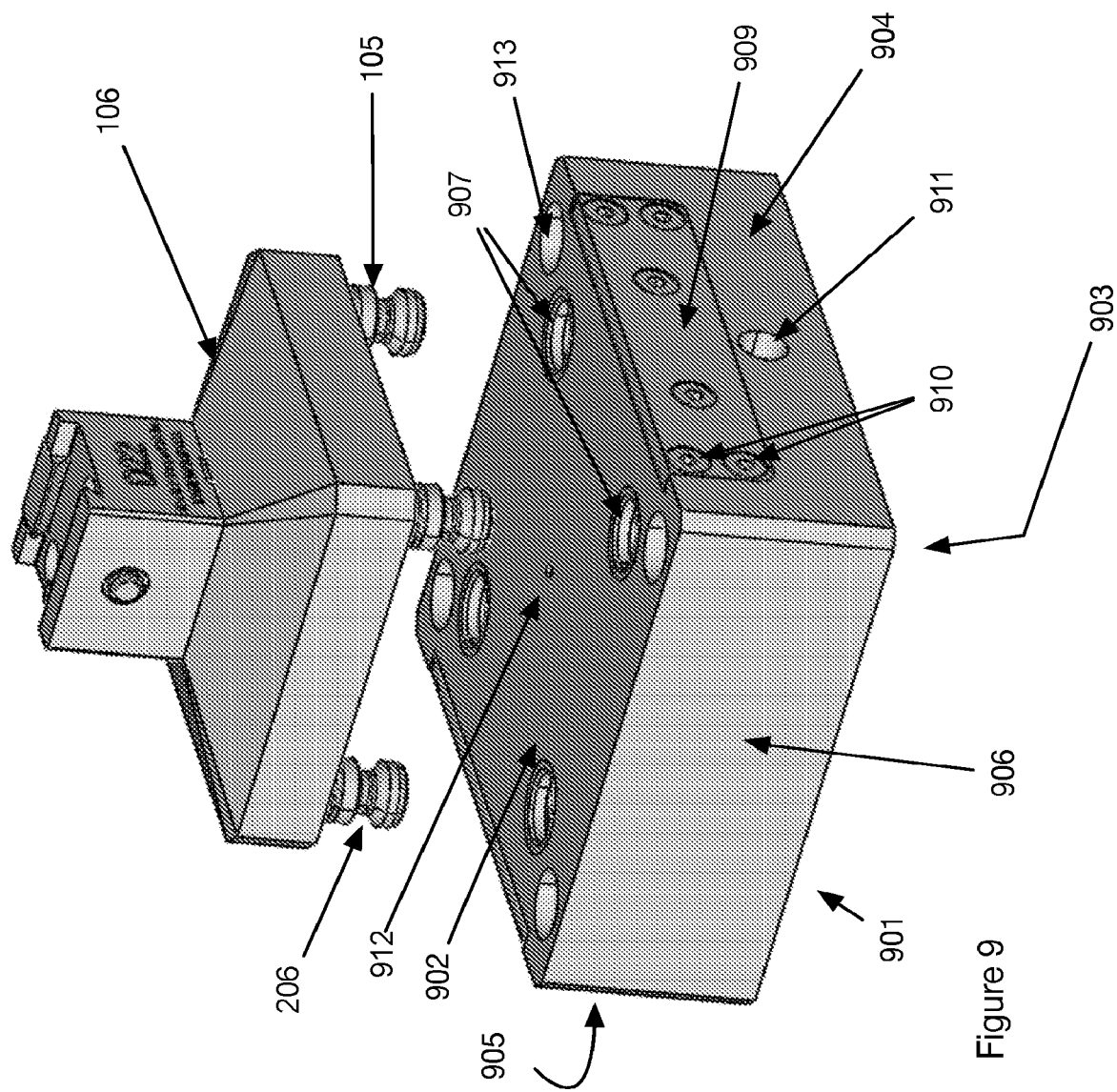
FIG. 9 shows an embodiment of a tooling base designed for automated actuation.
Figure 10:
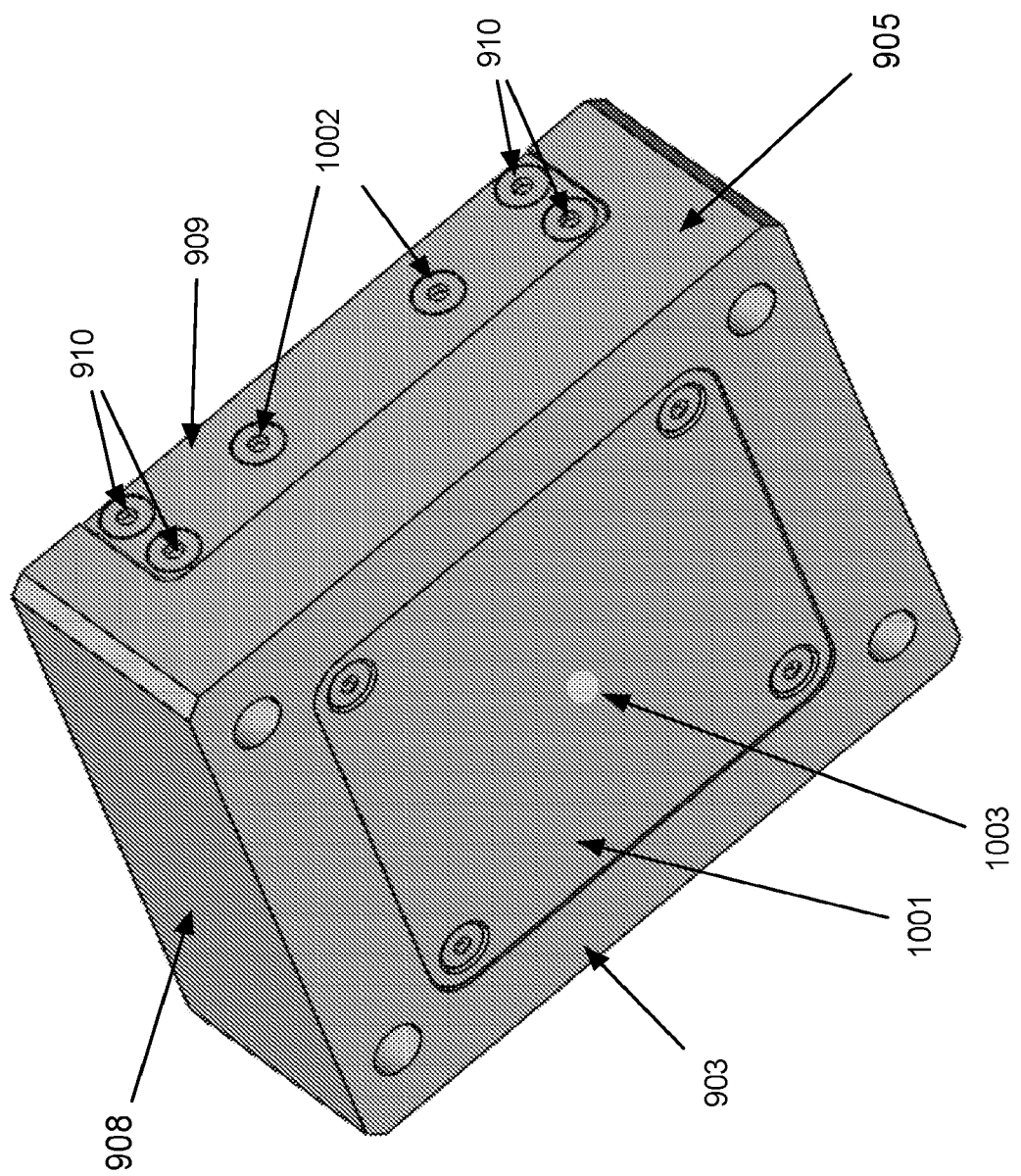
FIG. 10 shows a bottom view of the tooling base of FIG. 9.

In another embodiment shown in FIG. 9 a tooling base 901 includes components described in FIGS. 9-17 that enable a tooling base that may be operated either manually or automatically. In a preferred embodiment the tooling base may be actuated pneumatically using compressed air to activate the internal clamping mechanism that releasably holds the tooling fixture 106 to the base 901 using the alignment studs 105 that are clamped to the base through a clamping fixture shown in later drawings. The clamping fixture engages the indentations 206 on the alignment studs 105 to hold the tooling fixture to the base 901. The base 901 as shown in the figure has a rectangular box shape having a top surface 902 to which the tooling fixture 106 is to be attached, a bottom surface 903 and a plurality of vertical sides 904, 905, 906 only three of which are labeled. The top surface includes holes 907 in which the pins 105 are inserted and holes 913 to bolt or otherwise secure the tooling base 901 to a machining bed (not shown). In one embodiment the top surface 902 includes an orifice 912 connected to a compressed gas supply for blowing the compressed gas across the top surface 902 and thereby clean the top surface 902 of debris. The sides 904, 905 that are located on opposite sides of the tooling base 901 include a removable panel section 909, here shown as rectangular that is secured to the tooling base 901. In the example shown screws 910 are used to secure the panel 909 to the base. The end 904 further includes a port 911 to supply power to activate the clamping mechanism (shown in later Figures) within the tooling base. In a preferred embodiment the port 911 is used to supply power in the form of compressed air to the interior of the tooling base including supplying compressed air to both the clamping mechanism and the orifice 912. In other embodiments the port 911 supplies electrical power to the base that includes an electromechanical actuator. The base 901, as shown, includes a port on a first vertical face 904 of the base but could also be located on any of the surfaces of the base 901 such as the opposite surface 905 or the adjacent surface 906 or the top 902 or bottom 903 surfaces of the base 901. An alternate view of the base 901 is shown in FIG. 10. This shows the bottom surface 903 of the base that includes a panel 1001 clamped to the base and in the case of a pneumatically operated base forms an air tight seal to the base. Compressed air supplied to the base for automated operation is typically supplied by computer actuated valves as are known in the art. The version also shows an embodiment where the port 1003 for supplying power to the base for actuating the clamp and release mechanism is located in the base panel 1001. Additional features shown in FIG. 10 include the screws 910 that secure the panel 909 to the side 905 of the base 901. The base further includes adjustment screws 1002 that are used to adjust a spring force for the clamping mechanism. Note the panels 909 on the face 905 has an essentially identical counterpart on the vertical face 904 (seen in FIG. 9) opposite the face 905.

Figure 11:
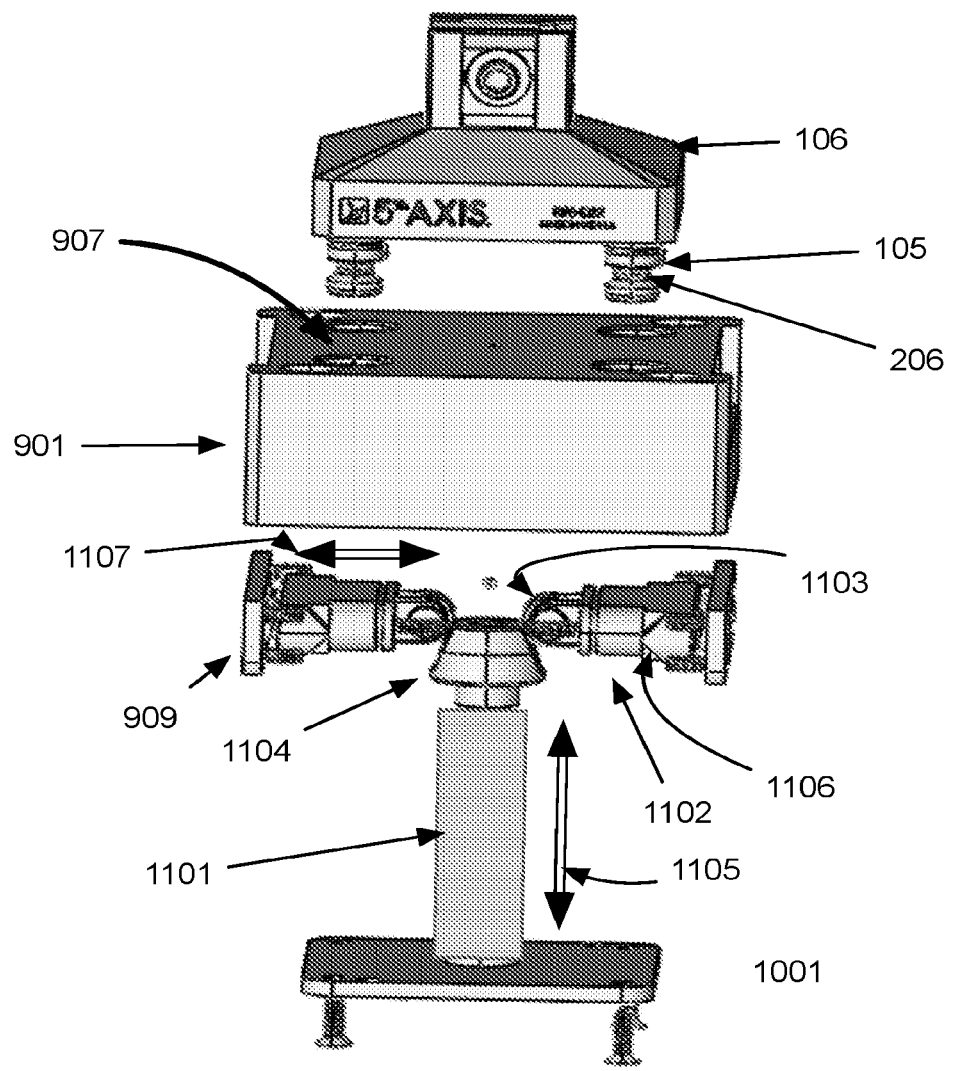
FIG. 11 shows an exploded view of the internal components in a tooling base that can be automatically actuated.

Internal components of the base of FIGS. 9 and 10 are shown in FIG. 11. Like numbered components are the same in all the drawings. Internal components of the base are shown below the base 901 and are not to scale. The internal components comprise an actuator 1101 that moves a tapered cam 1104 in a vertical direction 1105 up and down. When moved upward, the tapered cam 1104 engages a contact surface 1103 on a pair of clamping fixtures 1102 (only one of two is labeled) and as the tapered cam is moved upward and downward engagement of the tapered surface on the cam causes the fixtures to move in a horizontal 1107, outward and inward respectively, direction which causes the tapered cleats 1106 on the clamping fixtures 1102 to disengage and engage, respectively, the indentations 206 on the alignment studs 105 and unlock and lock the tooling fixture 106 to the base 901. The tapered cam 1104 has at least one tapered surface that engages the contact surface 1103 of the clamping fixture. The example shown includes two tapered surfaces 1207 on the cam. The clamping fixtures 1102 are spring loaded such that the default position is to be pressed inward towards the cam 1104 and thereby lock the cleats 1106 against the alignment stud 105 to hold the tooling fixture 106 to the tooling base 901. Movement of the actuator 1101 in an upward position thereby lifting the cam 1104 and pushing the clamping fixtures outward away from the cam causes the cleats 1106 to disengage the alignment studs 105 and release the tooling fixture 1096 from the base 901.

The actuator 1101 is any selected from a pneumatic cylinder, a screw, an electromechanical actuator, and a cam on a shaft that engages and lifts the cam 1104 when the shaft is twisted or slid horizontally.

In one embodiment the shaft is a double threaded screw as described in FIGS. 5-9 above. The shaft may be automatically actuated or extend beyond the base and be manually actuated. In a preferred embodiment the actuator is as described in FIGS. 16 and 17.

Figure 12:
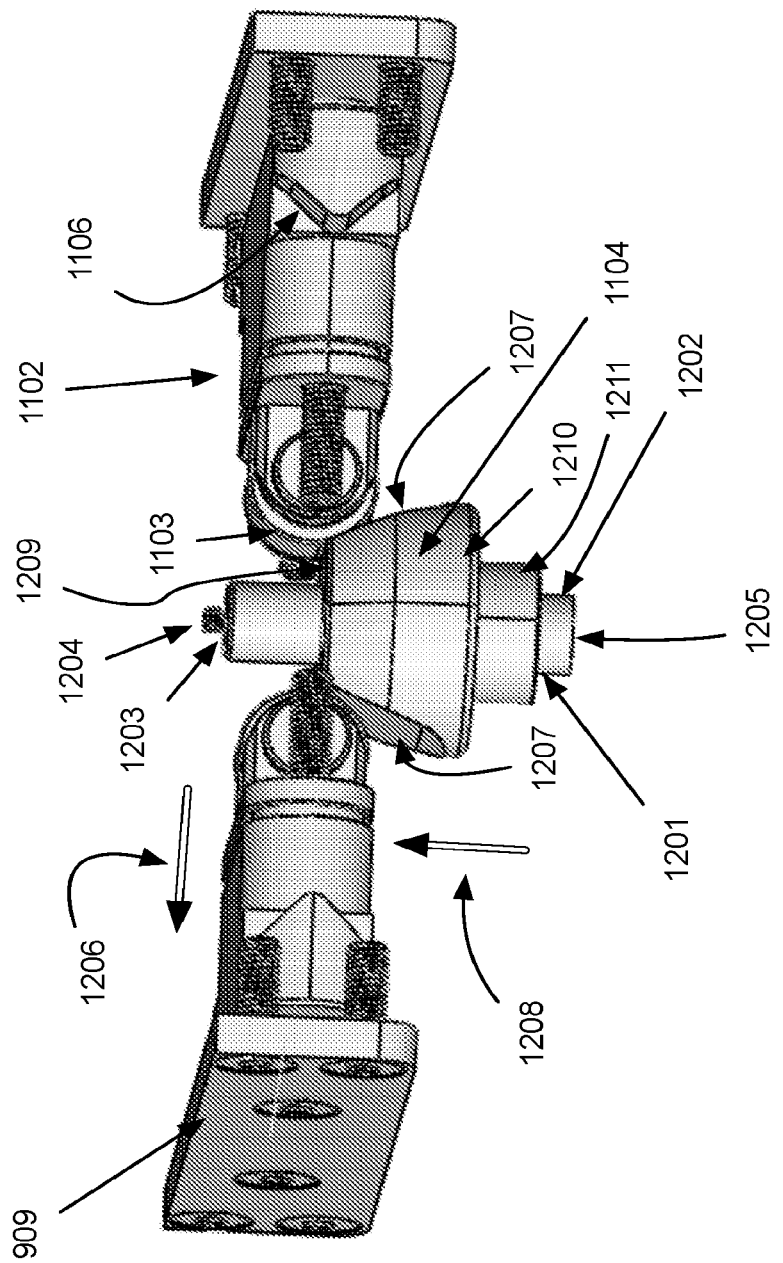
FIGS. 12-15 show various views of a clamping and release mechanism for a tooling base that can be automatically actuated.

Details of the clamping fixtures 1102 and their interaction with the cam 1104 are shown in FIGS. 12-15. Referring to FIG. 12, the cam 1104 is a tapered cylinder having a central opening 1201 through which a shaft 1202 extends. The cam 1104 when engaged by the actuator 1101 moves up and down by sliding on the shaft 1202. In a preferred embodiment the shaft is hollow and further includes a port 1203 and an adjustment screw 1204 that when turned adjusts the flow of air introduced at the bottom 1205 of the shaft 1202 and out the port 1203. In the case of the pneumatic actuator of FIGS. 16 and 17 turning of the adjustment screw also adjusts the differential air pressure above and below a piston actuator. When the actuator moves upward 1208 the surfaces 1207 on the cam 1104 engage surfaces 1103 on the clamping fixtures 1102 and cause the clamping fixture to move in an outward 1206 direction. In a preferred embodiment the surfaces 1103 are roller bearing surfaces thereby effectively reducing or eliminating sliding friction and wear of the surfaces 1207 and 1103. The cam 1104 is a tapered cylinder having a smaller diameter at the top 1209 of the cylinder than at the bottom 1210 of the cylinder. The cam 1104 further includes at least one tapered surface 1207 that engages the surface 1103 of the clamping fixture 1102. In the example shown there are two tapered surfaces 1207 on the cam that engage two clamping fixtures. In other embodiment the base 901 may include a single clamping fixture 1102 or a plurality of clamping fixtures. The surfaces 1207 are planar in the example shown causing movement of the clamping fixture 1102 in a direction 1206 perpendicular to the plane of the surface 1207. In other embodiments the surfaces 1207 may further include a curvature such that the movement 1206 of the clamping fixture 1102 may be more complex. In a non-limiting example, the surface 1207 may have a slope such that the movement of the clamping fixture include motion both perpendicular to 1206 and parallel to (out of the plane of the image) the surfaces 1207. In a preferred embodiment the tooling base consists of a single cam 1104 and a pair of clamping fixtures 1102. In other embodiments there is a single clamping fixture 1102 and a single cam 1104. In another embodiment (not shown) the tooling base 901 includes a plurality of clamping fixture 1102 that singly engage a plurality of cams 1104 all enclosed in a single tooling base 901. In one embodiment the plurality of cams is actuated by a single actuator. In another embodiment the plurality of cams is individually actuated by a plurality of actuators such that a plurality of tooling fixtures 106 may be held to the tooling base and individually attached and released.

Figure 13:
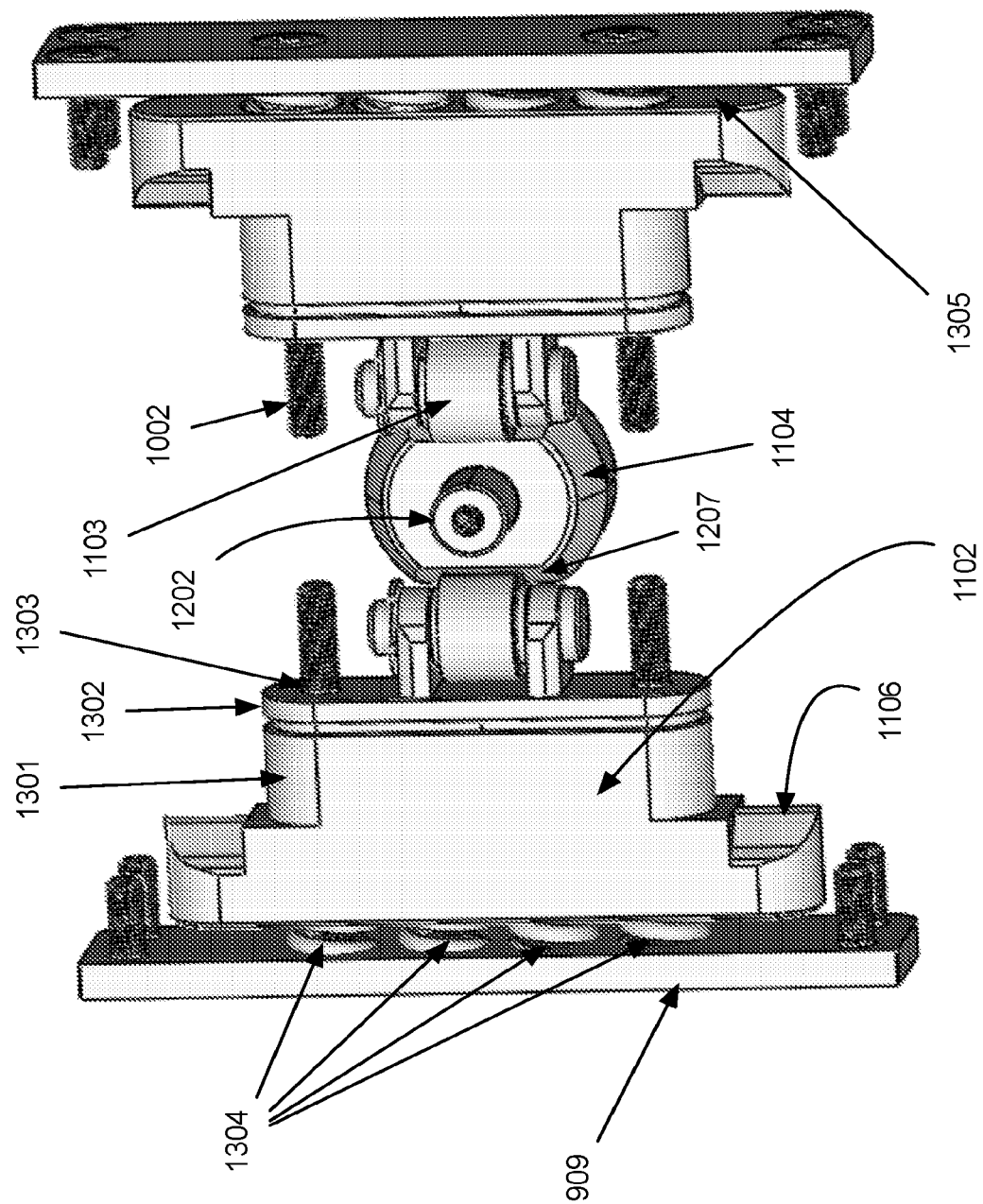
Figure 14:
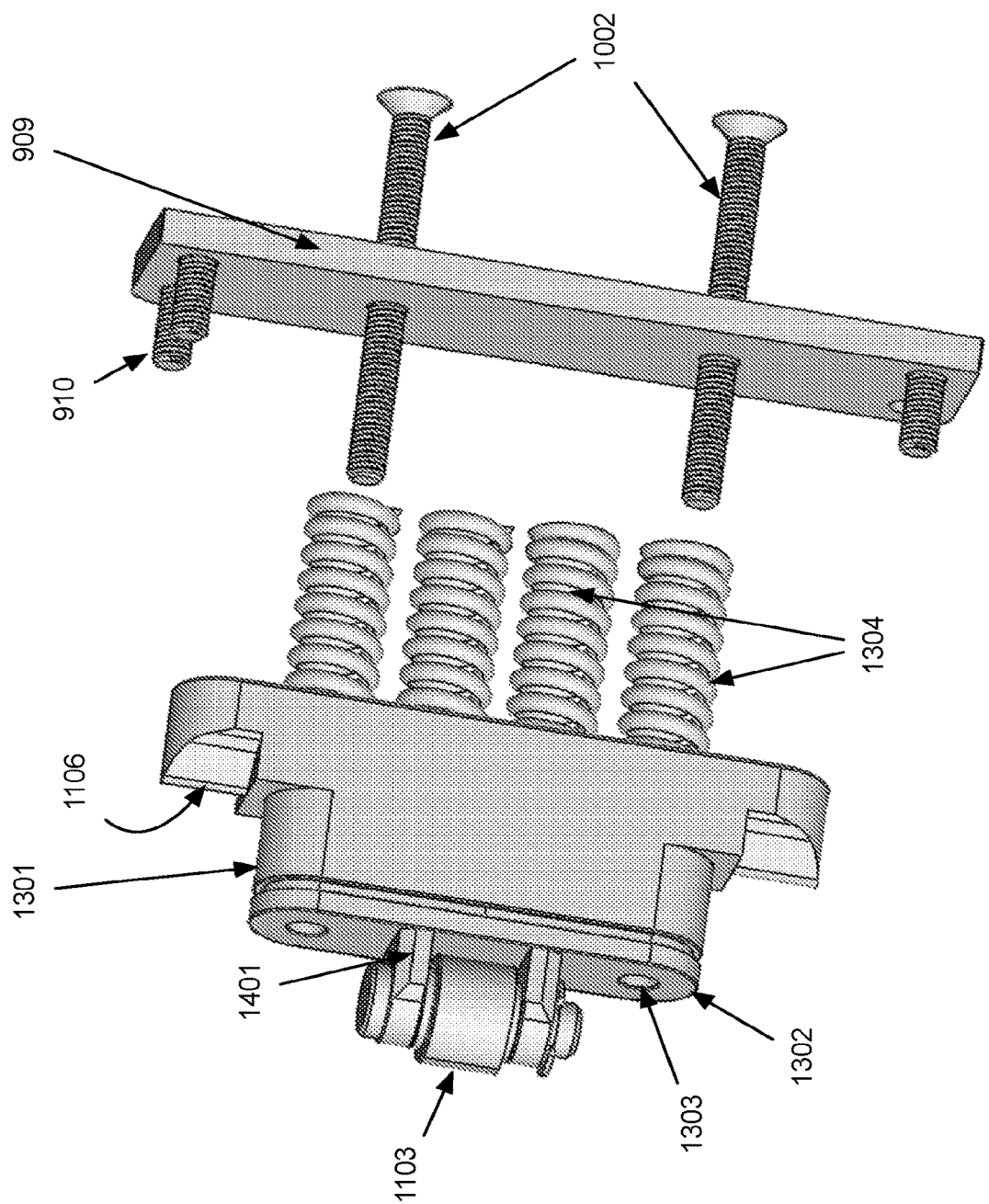
Figure 15:
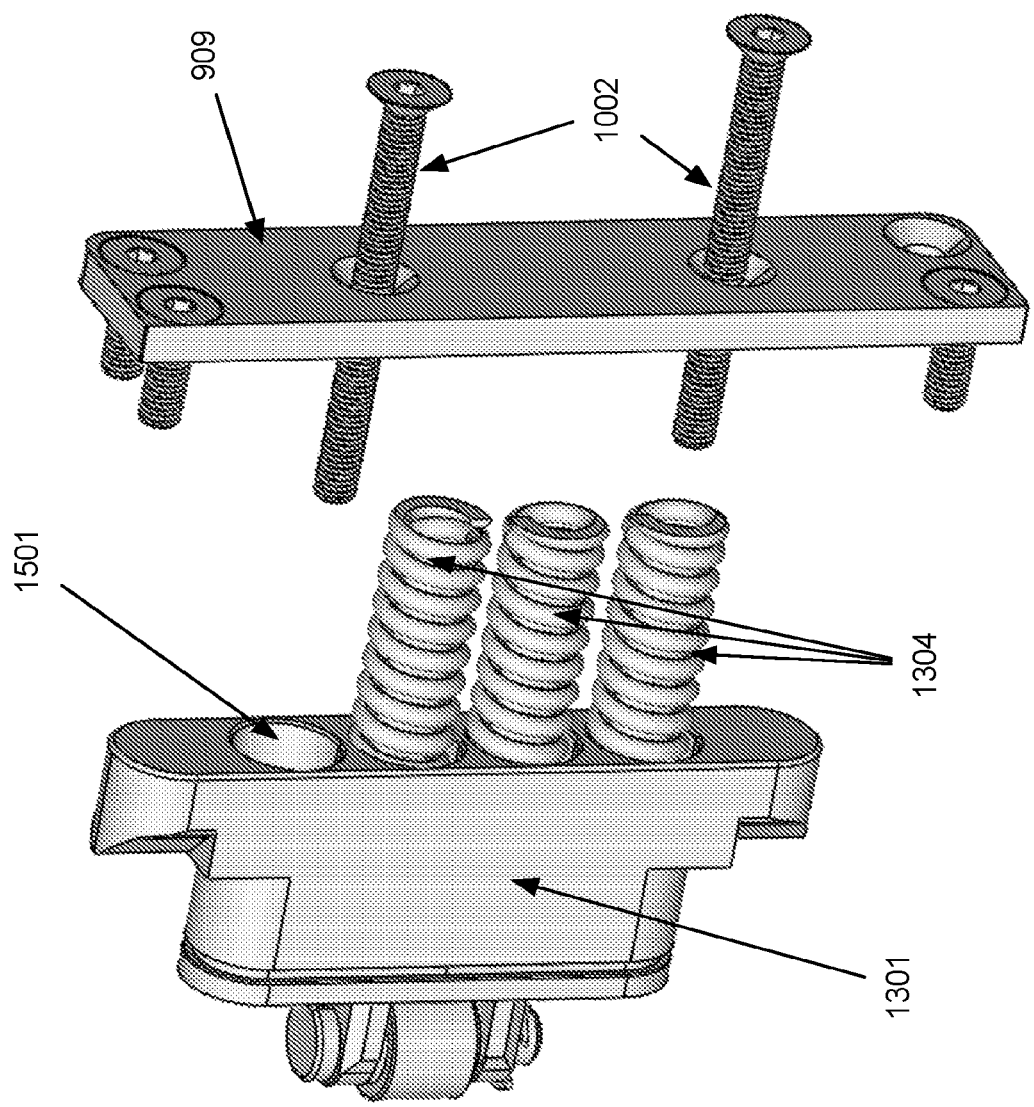

The clamping fixtures 1102 are spring loaded against the panel 909 the springs, seen more clearly in FIGS. 13-15, providing a force to move the clamping fixture inward (opposite 1206) as the cam is moved downward (opposite 1208). Movement of the clamping fixture 1102 inward causes the cleats 1106 to engage the alignment studs 105 and clamp the tooling fixture 106 to the base 901.

Referring to FIG. 13 the clamping fixture 1102 is comprised of main body 1301 that includes the cleats 1106. The body 1301 is held in tension against the backing plate 909 through compression of at least one spring 1304 (four are shown) the tension on the springs is adjusted by turning of the screws 1002 which engage threaded holes 1303. There is a gap 1305 between the clamping fixture 1102 and the plate 909. As the cleat 1104 is moved upward (out of the page in FIG. 13) the surface 1207 engages the surface 1103 and causes the clamping fixture to press against and compress the spring(s) 1304 and close the gap 1305. The springs may be pre-loaded using the adjustment screws 1002 such that the size of the gap 1305 is adjusted such that the cleats 1106 are clear of the tooling pins 105 and the tooling fixture may be removed from the base. The same adjustment also changes the force required to move the cam upward and thereby releasing the tooling fixture. The force is tailored to the force imparted by the particular actuator 1101. That is, the system is adjustable as to the clamping force of the cleats 1106 exerted on the alignment studs 105 and as to the release force (to compress the springs) to move the clamping fixtures and the cleats 1106 to release the tooling fixture 106.

Additional details of the clamping fixture are seen in the view of FIG. 14. The plate 909 is held against the tooling base (not shown) by the set of screws 910. The adjustment screws 1002, seen in this embodiment to be concentric with the outermost of the springs 1304, go through the body 1301 of the clamping fixture and are threaded through the holes 1303 contained in the plate 1302. Also attached to the plate 1302 are brackets 1401 that hold the contact surface 1103, which in this embodiment is a roller bearing. The view of FIG. 15 shows an embodiment where each of the springs 1304 are held in position by fitting within cavities 1501 located in the clamping fixture 1301. One of the springs has been removed to show the cavity.

Figure 16:
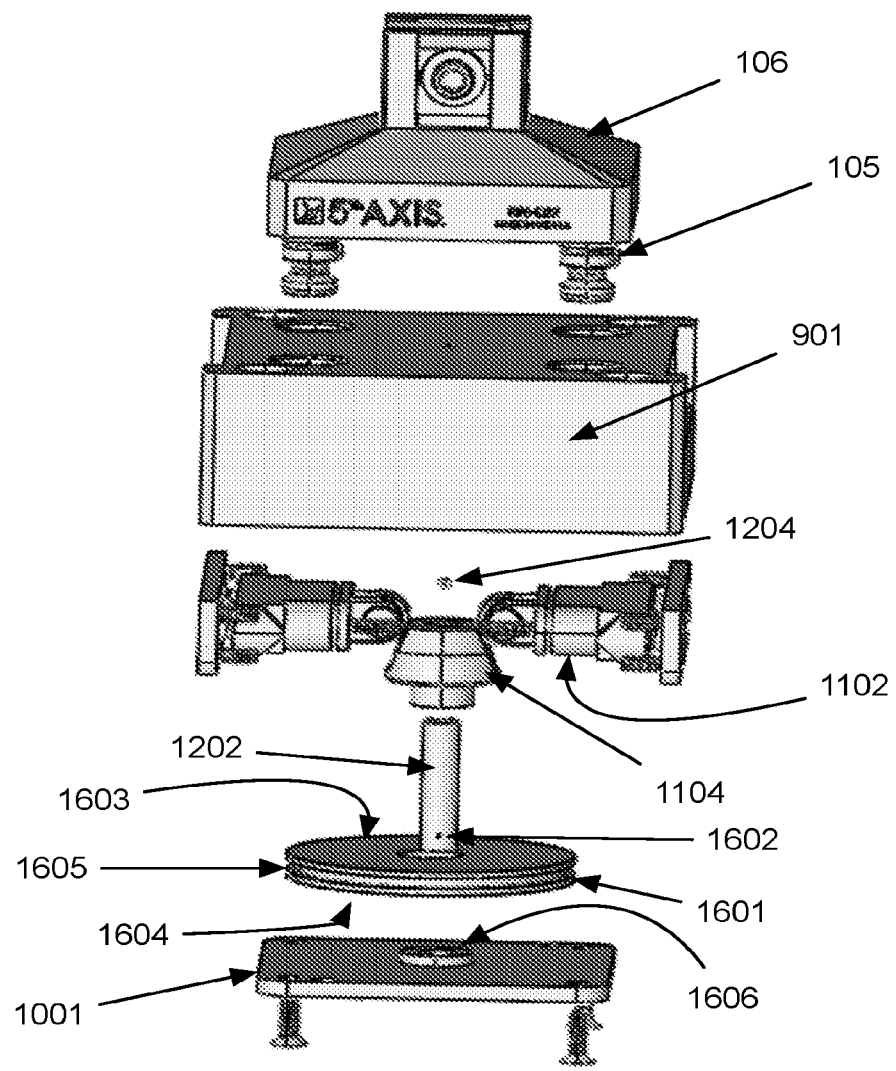
FIG. 16 shows an exploded view of components for a pneumatically actuated tooling base.
Figure 17:
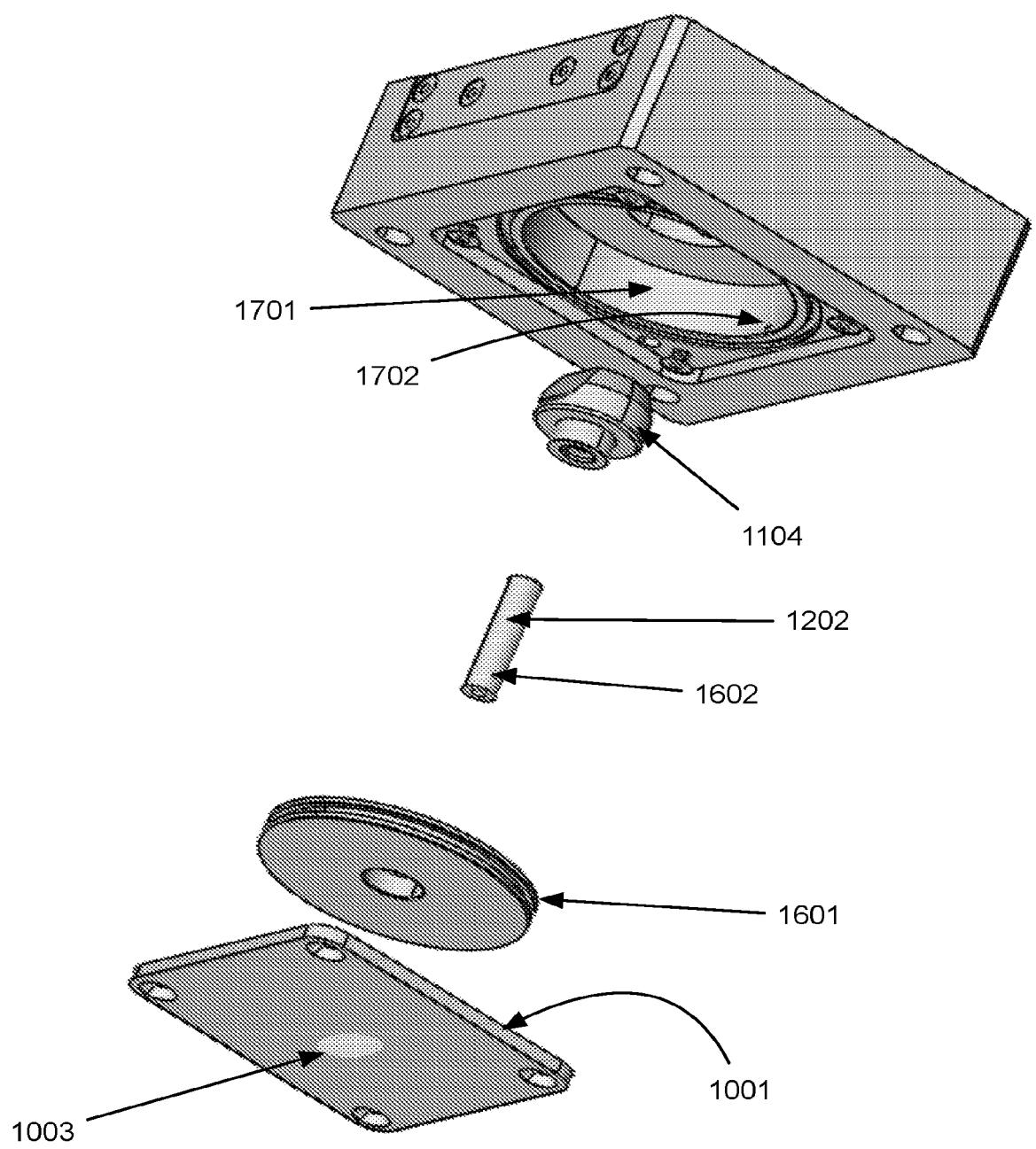
FIG. 17 shows additional details of the interior pneumatic actuator of the tooling base of FIG. 16.

The preferred embodiment of the actuator is shown in FIGS. 16 and 17. The parts already discussed are numbered consistently. The pneumatic actuator is comprised of piston 1601 that fits within a cavity 1701. The piston 1601 rides on the shaft 1202. When there is a differential pressure between the top surface 1603 and the bottom surface 1604 provided by compressed air or other fluid, and the pressure on the bottom surface exceeds that of the top surface by a specified margin, the piston the piston moves on the shaft upward and pushes upward against the cam 1104. If the pressure differential is sufficient so as to overcome friction forces and the spring force supplied by springs 1304, the cam engages the clamping fixture through surfaces 1207 contacting surface 1103 and forces the clamping fixtures apart and releases the tooling fixture 106 from the base 901. In a preferred embodiment the piston 1601 includes a groove 1605 and an o-ring within the groove (not shown) on the outer edge that engages with the walls of the cylinder 1701 forming a seal. In the embodiment shown the compressed air or other fluid is supplied by a port 1701 in the wall of the cylinder 1701. The hole 1702 located below the bottom surface 1604 of the piston when the base is assembled. In other embodiments the compressed air or other fluids is supplied through port fittings 1003 located in the bottom plate 1001 of the tooling base 901. The base 1001 further includes a cavity 1606 which holds the shaft 1202 in alignment with the center of the piston 1601 and the cam 1104. In the embodiment shown the shaft 1202 is hollow and conducts compressed air through the port 1602 at the bottom of the shaft and located below the piston 1601 when assembled. The port at the top of the shaft 1202 includes a bleed screw 1204 that controls the compressed air flow up the shaft and out of the port 912 to maintain a flow of air across the top surface 902 of the tooling base. The force of the compressed air or other fluid is adjusted through the incoming pressure and the amount of air bled off through the port 1602 through the shaft. The required force to actuate the release of the tooling base is determined by the angle of the flat surface 1207 relative to vertical, the adjustable, via screws 1002, tension on the springs 1304 and the spring constant of the springs 1304.

SUMMARY

A tooling base that is an improvement over current designs in the form of simplified number of parts, easier manufacturing of parts and that can be actuated for clamping and releasing a tooling fixture by pneumatic, other computer controlled means as well as manually is described. The tooling base uses clamping fixtures that are spring loaded to press cleats into recesses on alignment studs that locate and hold any variety of tooling fixtures to the base.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

What is claimed is:

1. A tooling base for removably aligning and attaching a tooling fixture to a work surface of a machine comprising:
   a) a base housing attached to the work surface of the machine, the base housing having a top surface, a bottom surface and a plurality of vertical side surfaces, an interior and tooling holes in the top surface, a plurality of alignment studs, the tooling holes each fitted with an alignment stud of the plurality of alignment studs, each of the alignment studs having an indentation and the alignment studs are attached to the tooling fixture,
   b) a clamping fixture fit inside the base housing and fixed to one of the plurality of vertical side surfaces, the clamping fixture including a main body and a backing plate, the main body including at least one tapered region, the at least one tapered region is inserted into the indentation on the alignment stud, and, when the tapered region is pressed and held against the indentation of the alignment stud, the tapered region locks the alignment stud in place, the clamping fixture further including at least one spring having a first end that contacts the main body, and, a second end of the spring pressing against the backing plate, the spring being between the backing plate and the main body, and the spring provides a force to press and hold the at least one tapered region of the main body against the indentation on the at least one tooling stud thereby locking the alignment stud in place within the tooling base, and, the clamping fixture further including a contact surface that when pressed compresses the spring and disengages the at least one tapered region on the clamping fixture from the indentation on the alignment stud and release the alignment stud from the tooling base, and,
   c) a cam that is moved is moved in a sliding motion along a shaft by an actuator such that when the cam is moved in a first direction a surface on the cam presses against the contact surface on the clamping fixture compresses the spring and releases the alignment stud from the tooling hole, and, when the cam is moved by the actuator in a second, opposite direction to the first direction, releases pressure against the contact surface on the clamping fixture and thereby causes the at least one tapered region of the clamping fixture to be pressed into the indentation on the alignment stud and thereby locks the alignment stud in place within the tooling base.

2. The tooling base of claim 1, the clamping fixture further including a cavity into which the first end of the at least one spring fits, and, thereby maintaining an alignment of the first end of the spring with the clamping fixture.

3. The tooling base of claim 1 wherein the actuator is a pneumatic actuator.

4. The tooling base of claim 1 wherein the actuator is an electromechanical actuator.

5. The tooling base of claim 1 wherein the actuator is an offset cam attached to a shaft such that when the shaft is turned in a first direction, the offset cam raises the cam and thereby releases the alignment stud from the tooling base and when the shaft is rotated in a second direction, the offset cam lowers the the cam and thereby clamps the alignment stud in place within the tooling base.

6. The tooling base of claim 3 wherein the pneumatic actuator comprises:
   a) a piston, the piston comprising a circular disc having a top surface, a bottom surface, a circumferential edge, and a centrally located hole connecting the top surface to the bottom surface, and,
   b) the piston located within a cylinder in the tooling base, the cylinder having cylinder walls and the circumferential edge of the piston forming a seal with the cylinder walls, and,
   c) a fluid held within the cylinder above and below the piston, the fluid having an internal pressure on either side of the piston such that when the pressure of the fluid on the bottom of the piston is greater than the pressure on the top of the piston, the piston moves in a direction from bottom to top, and, thereby contacting and moving the cam in the first direction, and, thereby moving the actuator such that the alignment stud is released from the tooling base, and, when the pressure of the fluid on the top of the piston is greater than that on the bottom of the piston, the piston moves in the second direction, and, thereby moving the actuator such that alignment stud is clamped in place within the tooling base.

7. The tooling base of claim 6 wherein the fluid is air.

8. The tooling base of claim 6 wherein the fluid is a hydraulic fluid.

9. The tooling base of claim 6, the piston further including a groove located in the circumferential edge of the piston and an o-ring fit within the groove, the o-ring providing the seal between the circumferential edge of the piston and the wall of the cylinder.

* * * * *